(12) United States Patent
Wen et al.

(10) Patent No.: US 8,828,519 B2
(45) Date of Patent: Sep. 9, 2014

(54) INFRARED-REFLECTIVE COATINGS

(75) Inventors: Fu-Chu Wen, Severna, MD (US);
Deborah E. Busch, Pasadena, MD (US);
Richard L. Fricker, Sparks, MD (US);
Robert Provins, Glen Burnie, MD (US);
Brian David Kiessling, Painesville, OH (US); David Edwin Bell, Glen Burnie, MD (US)

(73) Assignee: Cristal USA Inc., Hunt Valley, MD (US)

( * ) Notice: Subject to any disclaimer, the term of this patent is extended or adjusted under 35 U.S.C. 154(b) by 181 days.

(21) Appl. No.: 13/253,351

(22) Filed: Oct. 5, 2011

(65) Prior Publication Data

US 2013/0089706 A1    Apr. 11, 2013

(51) Int. Cl.
| | |
|---|---|
| B32B 3/00 | (2006.01) |
| C09D 5/33 | (2006.01) |
| C09D 161/06 | (2006.01) |
| C09D 131/04 | (2006.01) |
| C09D 155/02 | (2006.01) |
| C09D 7/14 | (2006.01) |
| C09D 125/14 | (2006.01) |
| C09D 123/06 | (2006.01) |
| C09D 161/28 | (2006.01) |
| C09D 7/12 | (2006.01) |
| C09D 163/00 | (2006.01) |
| C09D 183/04 | (2006.01) |
| C09D 177/00 | (2006.01) |
| C09D 167/00 | (2006.01) |
| C09D 133/00 | (2006.01) |
| E04D 5/00 | (2006.01) |
| C04B 41/00 | (2006.01) |
| E04D 3/00 | (2006.01) |
| C09D 175/04 | (2006.01) |
| E04D 1/00 | (2006.01) |
| C08K 3/22 | (2006.01) |
| C08L 61/28 | (2006.01) |

(52) U.S. Cl.
CPC ............ *C09D 123/06* (2013.01); *C09D 161/06* (2013.01); *C09D 131/04* (2013.01); *C09D 155/02* (2013.01); *C09D 7/14* (2013.01); *C09D 125/14* (2013.01); *C09D 161/28* (2013.01); *C09D 5/004* (2013.01); *C09D 7/12* (2013.01); *C08K 2003/2241* (2013.01); *C09D 163/00* (2013.01); *C09D 7/1216* (2013.01); *C08L 61/28* (2013.01); *C09D 183/04* (2013.01); *C09D 177/00* (2013.01); *C09D 167/00* (2013.01); *C09D 133/00* (2013.01); *Y02B 80/34* (2013.01); *E04D 5/00* (2013.01); *C04B 41/0018* (2013.01); *E04D 3/00* (2013.01); *C09D 175/04* (2013.01); *E04D 1/00* (2013.01)
USPC ........... 428/143; 428/141; 428/323; 428/402; 524/430; 524/493; 524/497; 523/458; 427/163.4; 427/218

(58) Field of Classification Search
USPC ........................................... 428/141, 143, 402
See application file for complete search history.

(56) References Cited

U.S. PATENT DOCUMENTS

| | | | |
|---|---|---|---|
| 5,898,180 A | 4/1999 | Venkataramani et al. | |
| 6,783,586 B2 | 8/2004 | Bettler et al. | |
| 7,250,080 B1 | 7/2007 | Craig et al. | |
| 7,452,598 B2 | 11/2008 | Shiao et al. | |
| 7,592,066 B2 | 9/2009 | Shiao et al. | |
| 7,641,959 B2 | 1/2010 | Joedicke | |
| 7,763,111 B2 | 7/2010 | El-Shoubary et al. | |
| 2005/0072110 A1 | 4/2005 | Shiao et al. | |
| 2005/0214533 A1* | 9/2005 | Shimosaki et al. | 428/375 |
| 2005/0271578 A1* | 12/2005 | Terada et al. | 423/610 |
| 2007/0028806 A1* | 2/2007 | Piro et al. | 106/446 |
| 2009/0196819 A1 | 8/2009 | Asakura | |
| 2009/0233121 A1 | 9/2009 | Leconte | |
| 2010/0104809 A1 | 4/2010 | Duda et al. | |
| 2010/0104857 A1 | 4/2010 | Joedicke | |
| 2010/0151199 A1 | 6/2010 | Shiao et al. | |
| 2010/0307553 A1 | 12/2010 | Defries et al. | |
| 2011/0041726 A1 | 2/2011 | Robb et al. | |
| 2011/0092359 A1* | 4/2011 | Kuroda et al. | 502/164 |

FOREIGN PATENT DOCUMENTS

| | | |
|---|---|---|
| KR | 1020070024285 | 3/2007 |
| WO | WO 2009/136141 | 11/2009 |

OTHER PUBLICATIONS

International Search Report and Written Opinion; PCT/US2012/058322; mailed May 15, 2013; 11 pages.

* cited by examiner

*Primary Examiner* — Maria Veronica Ewald
*Assistant Examiner* — Nathan Van Sell
(74) *Attorney, Agent, or Firm* — Dunlap Codding P.C.

(57) ABSTRACT

A composition includes polymer and dispersed infrared-reflective clusters of titanium dioxide primary particles. The titanium dioxide primary particles are cemented together with precipitated silica and/or alumina to form clusters. The titanium dioxide primary particles have an average particle diameter in the range of from about 0.15 to about 0.35 micron, while the clusters of titanium dioxide primary particles have an average cluster diameter in the range of from about 0.38 to about 5 microns and a geometric standard deviation (GSD) in the range of from about 1.55 to about 2.5.

16 Claims, 5 Drawing Sheets

INFRARED-REFLECTIVE COATINGS

CROSS REFERENCE TO RELATED APPLICATIONS

Not applicable.

STATEMENT REGARDING FEDERALLY SPONSORED RESEARCH OR DEVELOPMENT

Not applicable.

BACKGROUND

1. Field of Invention

The inventive concepts disclosed and claimed herein relate generally to a coating composition and, more particularly, but not by way of limitation, to a composition having infrared-reflective clusters of titanium dioxide particles cemented together with a precipitate.

2. Background of the Invention

With high energy costs and environmental concerns, there is continuing effort to reduce air conditioning requirements. An important approach for reducing air conditioning requirements is to use roofing products that reflect solar radiation. Radiation is the transfer of heat through electromagnetic energy, typically solar radiation. Absorption of radiation causes an increase in temperature at the absorbing surface and a transfer of the heat to underlying surfaces. In situations where it is desirable to reduce heating due to solar radiation, surfaces exposed to the solar radiation are treated to reflect or scatter the radiation rather than absorb it.

Solar radiation received on the surface of the earth comprises mostly visible and near-infrared (NIR) wavelengths, with NIR consisting of more than half of the total solar radiation. Visible wavelengths are those from about 400 nm to 700 nm while NIR wavelengths are those from about 700 nm to 2500 nm. Absorption of certain visible wavelengths and reflection of the un-absorbed visible light provides color. Coatings typically include colored pigments to obtain a desired color. For example, the color blue is obtained by using blue pigment to absorb most of the non-blue visible light with wavelengths longer than 460 nm.

Typically, black surfaces and ones having a dark color tend to absorb solar radiation causing an increase in the surface temperature. In contrast, white surfaces tend to reflect or scatter solar radiation, causing much less heating. While white surfaces offer desirable heat absorption properties, in many applications the lack of surface color is aesthetically unpleasing. Since the human eye can not see infrared light, the absorption or reflection of the infrared light by the colorants bears no consequence on the color of the coatings. Thus, a surface coating should ideally absorb only the visible radiation necessary to provide the desired color, and absorb none of the NIR radiation.

Unfortunately, most of the conventional colorants strongly absorb infrared light. The U.S. EPA Energy Star Initiative requires that to get LEED (Leadership in Energy and Environmental Design) credit, the total solar reflectance (TSR) needs to be greater than 78% for a low sloped roof, and greater than 25% for a steep sloped roof. For the most part, products that have a TSR greater than 78% are either white or metallic, which is often not aesthetically pleasing. Darker colored roofing materials have a TSR in the 20 to 30 percent range; therefore, most dark colored residential roofs must be steep sloped. Thus there is a need for economic colorants and coating compositions that can provide high solar reflectance and reduced solar heat absorption, as well as desired color and aesthetic appearance.

SUMMARY OF THE INVENTION

A composition is provided comprising a polymer with infrared-reflective clusters of titanium dioxide primary particles dispersed therein. The titanium dioxide primary particles are cemented together with a precipitate to form clusters. The titanium dioxide primary particles have an average particle diameter in the range of from about 0.15 to about 0.35 micron, the clusters of titanium dioxide primary particles have a geometric mass mean diameter in the range of from about 0.38 to about 5 microns, and the clusters of titanium dioxide primary particles have a geometric standard deviation (GSD) in the range of from about 1.55 to about 2.5.

A method of reducing radiant energy absorption includes the following steps. A coating precursor is provided having therein infrared-reflective clusters of titanium dioxide primary particles. The titanium dioxide primary particles are cemented together with precipitated silica and/or alumina to form the clusters as described above. The coating precursor is then applied to a surface to form an infrared reflective coating upon drying or curing.

In another embodiment, an infrared-reflective roofing article is provided having a base substrate with an upper surface, and a water resistant coating material covering at least a portion of the upper surface of the base substrate. The coating material includes infrared-reflective clusters of titanium dioxide primary particles. The titanium dioxide primary particles are cemented together with precipitated silica and/or alumina to form the clusters as described above.

In yet another embodiment, a metal coil at least partially coated with a coating material comprising the above-described infrared-reflective clusters is provided. Similarly, infrared-reflective roofing granules are provided. The infrared-reflective roofing granules include base rock or mineral granules covered with a water resistant coating material comprising the above-described infrared-reflective clusters.

In another embodiment, a method of making infrared-reflective clusters of titanium dioxide primary particles includes the following steps. An aqueous slurry of titanium dioxide particles is treated to deposit precipitated silica and/or alumina on the titanium dioxide particles. The slurry of treated titanium dioxide particles is then dried to form titanium dioxide clusters having a geometric mass mean diameter in the range of from about 0.38 to about 5 microns, while the clusters of titanium dioxide particles have a geometric standard deviation (GSD) in the range of from about 1.55 to about 2.5. The titanium dioxide clusters are packaged without micronization such that the titanium dioxide clusters retain a geometric mass mean diameter in the range of from about 0.38 to about 5 microns.

In yet another embodiment, a method of making infrared-reflective clusters of titanium dioxide primary particles includes the following steps. An aqueous slurry of titanium dioxide particles is treated to deposit precipitated silica and/or alumina on the titanium dioxide particles. The slurry of treated titanium dioxide particles is then dried to form titanium dioxide clusters having a geometric mass mean in a range of from about 0.38 to about 5 microns, while the clusters of titanium dioxide particles have a geometric standard deviation (GSD) in the range of from about 1.55 to about 2.5. The titanium dioxide clusters are fed through a micronizing system using steam or air pressure low enough to result in product titanium dioxide clusters retaining a geometric mass mean diameter in the range of from about 0.38 to about 5 microns and a geometric standard deviation (GSD) in the range of from about 1.55 to about 2.5.

In yet another embodiment, a method of making an infrared reflective coating includes dispersing the infrared-reflective cluster of titanium dioxide primary particles described above into a coating formulation.

Thus, utilizing (1) the technology known in the art; (2) the above-referenced general description of the presently claimed and disclosed inventive concept(s); and (3) the detailed description of the inventive concepts that follows, the advantages and novelties of the presently claimed and disclosed inventive concept(s) are readily apparent to one of ordinary skill in the art.

DETAILED DESCRIPTION OF THE INVENTION

Before explaining at least one embodiment of the presently disclosed and claimed inventive concept(s) in detail, it is to be understood that the presently disclosed and claimed inventive concept(s) is not limited in its application to the details of construction, experiments, exemplary data, and/or the arrangement of the components set forth in the following description or illustrated in the drawings. The presently disclosed and claimed inventive concept(s) is capable of other embodiments or of being practiced or carried out in various ways. Also, it is to be understood that the phraseology and terminology employed herein is for the purpose of description and should not be regarded as limiting.

Solar radiation at sea level consists of three wavelength regions: Ultraviolet (UV), Visible, and Infrared (IR). The UV wavelengths are from 280 nm to 400 nm. The visible wavelengths are from 400 nm to 700 nm. The IR wavelengths are from 700 nm to 2500 nm. The energy of the solar radiation in each region is about 4%, 42%, and 54%, respectively, for the UV, Visible, and Infrared.

Normal coatings are made with pigments and an organic or inorganic vehicle. The pigments are used to either absorb or reflect visible light. The vehicle is used to bind the pigments in the coating. Titanium dioxide, with high refractive indices for visible and infrared wavelengths, is an excellent material for reflecting solar radiation. In fact, normal titanium dioxide ($TiO_2$) pigments, while designed to scatter or reflect visible light, have been found to also strongly scatter or reflect NIR light.

Figure 1:
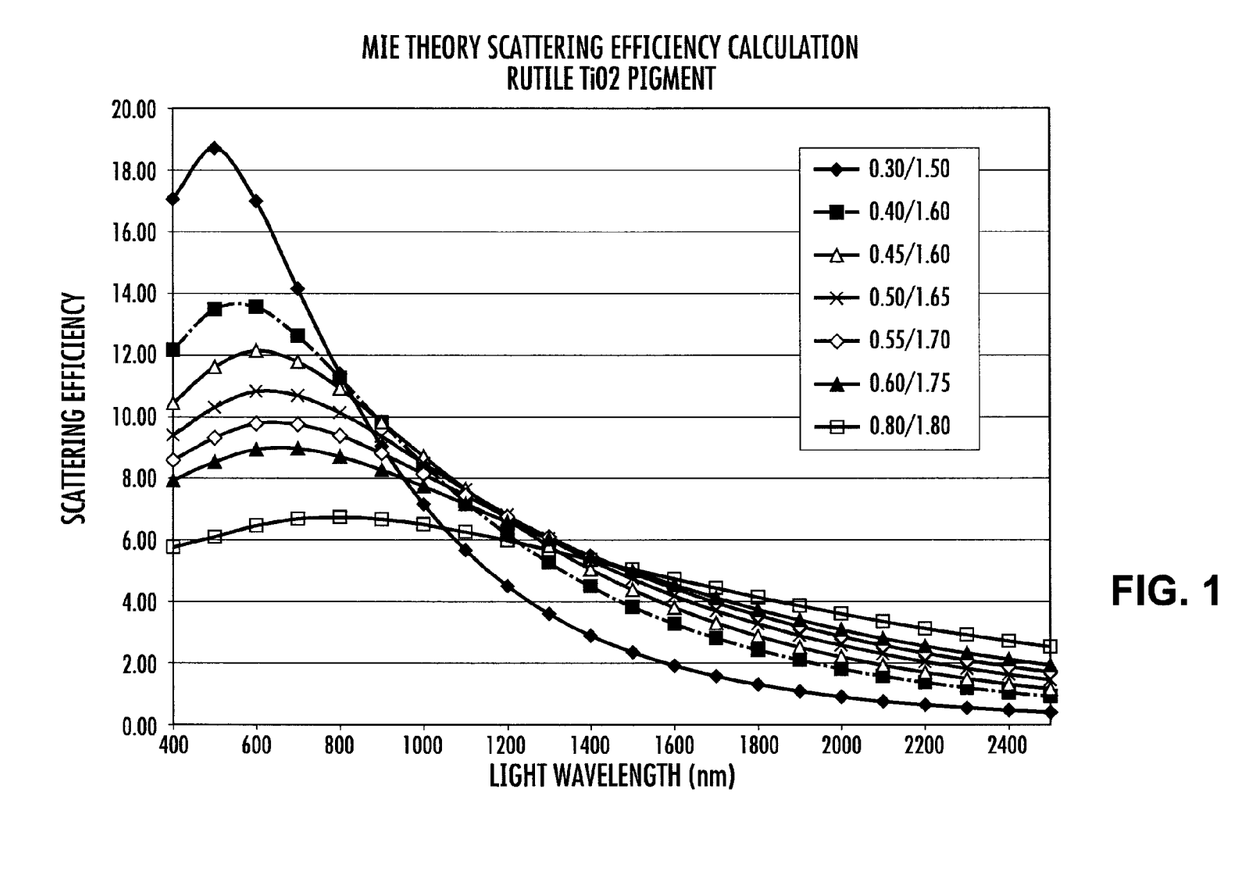
FIG. 1 is a graphical representation of the theoretical scattering efficiency for different particle sizes of $TiO_2$.

From Mie theory, it is established that smaller $TiO_2$ pigment particles are more efficient for scattering light of shorter wavelengths (e.g., blue); and larger particles are more efficient for scattering longer wavelengths (e.g., red and infrared). This has been verified by practical measurement, showing that the optimal particle size for light scattering is about one-half of the light wavelength (e.g. 0.24 p rutile $TiO_2$ for green light at 560 nm). Referring now to FIG. 1, one can see the theoretical effect of $TiO_2$ particle size on scattering efficiency in the visible and IR wavelengths. Commercial $TiO_2$ pigment has a geometric mass mean particle size of about 0.30 micron and a geometric standard deviation (GSD) of about 1.50 such that visible light scattering efficiencies are optimized to produce a high tinting strength. However, the IR scattering efficiencies are rather weak. As the mean particle size and GSD increase, the visible scattering efficiencies decrease; however, the IR scattering efficiencies remain about the same. These light scattering calculations show that the optimal particle size of $TiO_2$ for reflecting the maximum amount of solar infrared light is at about 0.40 micrometer (p) and higher.

However, the use of larger $TiO_2$ particles requires a trade-off. At a particle size of 0.40p, $TiO_2$ also scatters significant visible light. Using $TiO_2$ pigment with a high visible light scattering efficiency will yield good opacity or hiding power in coatings; however, it will also necessitate an increased usage of color pigments to obtain the same desired color/shade level. Color pigments absorb NIR, causing additional total heat absorption, and the color pigments used for heat-reflective applications are typically much more expensive than $TiO_2$. Considering both the light scattering effect and economics of the more expensive color pigments, additional calculations indicate the optimum size of $TiO_2$ particles for dark heat-reflecting coatings should be about 0.4 micron and larger.

Unfortunately, the processing costs for making the larger diameter $TiO_2$ pigment particles are significant. Surprisingly, however, it has been discovered that lower-cost pigment-size titanium dioxide primary particles, cemented together with precipitated silica and/or alumina to form clusters, can provide very good NIR reflection. Additionally, it was found that the $TiO_2$ clusters do not provide the excellent visible light scattering seen with the individual particles, and thus significantly reduce the amount of colorant needed.

Specifically, it has been found that titanium dioxide primary particles having an average particle diameter in the range of from about 0.15 to about 0.35 micron, cemented together with a precipitated silica and/or alumina to form infrared-reflective clusters having a geometric mass mean diameter in the range of from about 0.38 to about 5 microns and a geometric standard deviation (GSD) in the range of from about 1.55 to about 2.5, can be used to provide coatings with improved infrared-reflective properties. In one embodiment of the present disclosure, a coating composition includes polymer and such infrared-reflective clusters dispersed therein. The phrase "precipitated silica and/or alumina" is used herein and in the appended claims to mean that the precipitate referred to can be precipitated silica, precipitated alumina, or combinations of precipitated silica and precipitated alumina. The "precipitated silica" and the "precipitated alumina" are discussed in detail hereinafter. The term "primary particles" refers to unaggregated or unagglomerated TiO2 crystals.

Commercial $TiO_2$ pigment typically has a geometric mass mean particle size in the range of from about 0.2 micron to 0.36 micron and a geometric standard deviation (GSD) in the range of from about 1.40 to about 1.55. In one embodiment, the infrared-reflective clusters have a geometric mass mean diameter in the range of from about 0.38 to about 1 micron. In yet another embodiment, the infrared-reflective clusters have a geometric standard deviation (GSD) in the range of from about from 1.58 to about 2.00.

The titanium dioxide primary particles may be treated or untreated titanium dioxide obtained directly from a production process such as the chloride or sulfate processes. Further, the $TiO_2$ can have an anatase or rutile crystal structure. In one embodiment, the $TiO_2$ primary particles comprise treated or untreated rutile particles produced by the chloride process. Rutile $TiO_2$ absorbs UV light for wavelengths shorter than 405 nm while anatase $TiO_2$ absorbs UV light for wavelengths shorter than 385 nm. While the solar UV radiation is largely absorbed and transformed to heat, since the solar radiation is between 385 nm and 400 nm represents only about 0.3% of the total solar radiation, anatase and rutile offer essentially the same heat resistance.

While not necessary, the $TiO_2$ primary particles can be surface treated with organic or inorganic compounds, such as precipitated oxides of phosphate, titanium, or zirconium prior to cementation with precipitated silica and/or alumina. $TiO_2$ pigment surface treatments are known to those skilled in the art and are used to provide properties such as weatherability, durability and enhanced dispersibility in various carriers.

The term "precipitated silica" as used herein and in the appended claims refers to any silicate; oxide, hydrous oxide, or hydroxide of silicon; and any other silicon and oxygen-containing precipitate from an aqueous soluble silica. Nonexclusive examples of aqueous soluble silica include sodium silicate and potassium silicate. The amount of precipitated silica used to cement the primary $TiO_2$ particles together is dictated by the desired cluster size. Typically the precipitated silica is present in an amount in the range of from about 2 wt % to about 20 wt % based on the weight of titanium dioxide. In some embodiments the precipitated silica is present in the clusters in an amount in the range of from about 3 wt % to about 7 wt % based on the weight of $TiO_2$ in the clusters.

The term "precipitated alumina" as used herein and in the appended claims refers to any alumina; oxide, hydrous oxide, or hydroxide of aluminum; and any other alumina and oxygen-containing precipitate from an aqueous soluble alumina. Nonexclusive examples of aqueous soluble alumina include sodium aluminate and aluminum sulfate. The amount of precipitated alumina used to cement the primary $TiO_2$ particles together is dictated by the desired cluster size. Typically the precipitated alumina is present in an amount in the range of from about 2 wt % to about 10 wt % based on the weight of titanium dioxide. In some embodiments the precipitated alumina is present in the clusters in an amount in the range of from about 3 wt % to about 5 wt % based on the weight of $TiO_2$ in the clusters.

A composition containing the above-described clusters can include synthetic or natural polymers and resins and can be either solvent based or water based. Examples of suitable polymers and resins include, but are not limited to, alkyds, acrylics, vinyl-acrylics, styrene acrylics, vinyl acetate/ethylene (VAE), polyvinyl acetates (PVA), polyurethanes, polyesters, polyamides, phenolics, melamine resins, epoxy, silicones and oils.

In one embodiment, the composition includes the above-described infrared-reflective, silica and/or alumina cemented clusters of titanium dioxide and a polymer such as polyethylene, polyvinyl chloride, thermoplastic olefin, acrylonitrile butadiene styrene, or acrylonitrile-styrene-acrylic. As understood by those skilled in the art, the composition can include additional pigmentary titanium dioxide as well as colorants and other additives.

In another embodiment, a method of reducing radiant energy absorption includes providing a coating composition precursor having dispersed therein the infrared-reflective clusters of titanium dioxide described above, and applying the coating composition precursor to a surface to form an infrared reflective coating upon drying or curing. The term "curing" is used herein to include processes involving thermosetting, catalysis, UV-curing, and other means for solidifying a coating after application. Nonlimiting examples of coating precursor compositions include paint, varnish, curable powder coatings, porcelain enamel powders, molten plastics, and the like.

Infrared-reflective roofing articles can be prepared by application of a water resistant coating material comprising the infrared-reflective $TiO_2$ clusters described above to at least a portion of an upper surface of a base substrate. Examples of suitable base substrates include, but are not limited to, metal coil stock as discussed above, asphalt shingles, ceramic roofing tiles, metal shakes, concrete roofing tiles, cedar shakes, natural slate roofing tiles and synthetic slate roofing tiles.

The coating composition can be, for example, a standard paint formulation or a metal coil coating. Metal coil stock coated with the inventive compositions disclosed herein obtains much improved solar heat resistance. Infrared-reflective roofing granules are another application wherein base rock or mineral granules are coated with a water resistant coating material including the infrared-reflective $TiO_2$ clusters described above.

Infrared-reflective clusters of $TiO_2$ primary particles can be made by adding any soluble silica and/or alumina to an aqueous slurry of appropriately sized $TiO_2$ particles and causing the silica to precipitate by, for example, adjusting the pH. Such silica and alumina coating processes are practiced commercially by chloride and sulfate process titanium dioxide pigment manufacturers when making dense-silica treated pigment. Processing can include neutralization of the slurry if necessary, filtration and washing, followed by drying. For example, the pigment grades RCL-6™ and TIONA® 696 are super-durable pigments designed for outdoor use. In order to have very good durability, the pigments are treated with dense silica at about 6.5% and 3.5%, respectively. Because of the high dense silica treatments, the $TiO_2$ particles are agglomerated together after surface treatment. Particle size measurements show that the mean cluster size of the spray dryer discharge is about 0.6 micrometers. However, commercial pigment is then deagglomerated in a fluid-energy mill such as a micronizer. Micronization is necessary to break up the clusters so that the pigment will efficiently scatter visible light. After micronization, the mean size is reduced to about 0.33 micrometer for RCL-6™ and 0.30 micrometer for TIONA® 696.

In order to make the infrared-reflective clusters for the presently disclosed compositions, the spray dryer discharge by-passes the micronization step to maintain the necessary agglomeration and high average cluster diameter. Alternatively, the spray dryer discharge can be fed to a micronizer operated at greatly reduced steam or air pressure to produce titanium dioxide clusters having a geometric mass mean cluster diameter in the range of from about 0.38 to about 1 micron and a GSD still in the range of from about 1.55 to about 2.5. With the high dense silica treatment on the $TiO_2$ particles, the clusters also have the high durability required for outdoor applications.

In order to further illustrate the present invention, the following examples are given. However, it is to be understood that the examples are for illustrative purposes only and are not to be construed as limiting the scope of the invention.

EXPERIMENTAL PROCEDURES USED IN EXAMPLES

Optical Density Particle Size Measurement. The particle size distribution of $TiO_2$ is measured using an optical method. The method was first described by L. W. Richards in *Pigment Handbook, Vol. III*, p. 89 (1973). A similar method was described by D. F. Tunsdall in the UK Patent, GB2046898 (1980). In this method, the $TiO_2$ primary particles or clusters are dispersed in water in the form of dilute suspension. The attenuation of light by $TiO_2$ particles or clusters in the suspension is measured using a UV-VIS spectrophotometer (Perkin-Elmer, Model 2S). The scattering efficiencies or the "optical densities" are measured as a function of the light wavelength.

The scattering efficiency curve is normalized by setting the value equal to 1 at 440 nm. The values are compared with the normalized theoretical calculated scattering efficiency values to determine the particle size distribution of the sample. In the theoretical calculation, a log-normal distribution of the particles is assumed. A series of curves are calculated for the geometric mass mean sizes ranging from 0.200 to 1.00 micrometer and the geometric standard deviations (GSD) ranging from 1.400 to 2.400. By matching the measured curve with the theoretical curves to find the best fit, the log-normal particle size distribution of the sample, presented as mean size and GSD, can be determined. The mean size and GSD of the samples measured by the optical density method have been shown to be very similar to the values measured by electron microscope counts of about 500 to 1000 particles.

For many particulates, the observed particle size distribution approximates a log-normal distribution. Therefore, it is often beneficial to work with particle size distributions on a logarithmic basis. The log-normal distribution is based on the normal distribution. It describes a variable, x, where log(x) is normally distributed and is valid for values of x which are greater than zero. In aerosol science, it has been observed that where the volume of a particle is proportional to size, the population is probably log-normally distributed. Thus the terms "geometric mean diameter" and "geometric standard deviation" (GSD), are substituted for "arithmetic mean diameter" and "standard deviation" when incorporating logarithms of numbers. When the frequency of the particle size distribution is based on mass, the more specific term "geometric mass mean diameter" is used.

The spread of a log-normal distribution is controlled by the geometric standard deviation. The smaller the geometric standard deviation, the more concentrated are the data. If one adds percentages, one will see that approximately a) 68% of the distribution lies within the x between Mean/GSD and Mean*GSD; b) 95% of the distribution lies within the x between Mean/$(GSD)^2$ and Mean*$(GSD)^2$; and c) 99.7% of the distribution lies within the x between Mean/$(GSD)^3$ and Mean*$(GSD)^3$.

Dispersion of Pigments. In the preparation of the wet coatings, the pigments have to be dispersed uniformly in the coating media. The dispersion process normally uses a high speed disperser, and optionally, a media (bead) mill. In the media milling process, products to be dispersed are premixed, and fed to the milling chamber with a metering pump controlling process residence time. The water-cooled milling chamber is filled with small media and agitated by a centrally located series of disks creating intense shear and impact forces. Process quality is determined by product feed rate, agitator rotational speed, grinding media type, size and loading, along with product formulation.

The media mill used to prepare the coating samples is an Eiger Laboratory Mini Mill Model M100 made by Eiger Machinery, Inc. The volume of the milling chamber is 100 ml. The chamber is filled with 70 ml of the milling media. Ceramic media with a density of 4.3 and diameter at 2 mm is used. In operation, the agitator rotational speed is set at 3000 rpm. Samples are premixed using a high speed DISPERMAT® disperser. This disperser has a 2.5" Cowles blade and a rotation speed of 3000 rpm is used. The premixed samples are then poured into the feed funnel with the mill operated at low rpm. With the end plate set to re-circulate, the rpm is increased to the desired level and product is allowed to circulate until the degree of product quality is achieved. Product from the feed funnel is pumped into the milling chamber and an agitated bed of grinding beads. The agitator rotational speed is electronically controlled. Product quality is determined by adjusting the chamber residence time and by adjusting the agitator rotational tip speed and the product formulation.

Preparation of Coil Coatings. In order to test and compare the optical performance of the $TiO_2$ samples in a polyester coil coating, the following test formula in Table 1 is used.

TABLE 1

Polyester Coil Coating Test Formula

| | Weight (g) |
|---|---|
| White Paint | |
| A. Polyester Coil Grind | |
| POLYMAC ™ 220-1935 resin | 116.2 |
| DISPERBYK ® 110 | 7.1 |
| TiO2 | 177.6 |
| B. Polyester Coil Letdown | |
| Grind (from A) | 132.0 |
| POLYMAC ® 220-1935 resin | 76.4 |
| CYMEL ® 303 | 15.1 |
| NACURE ® 2500 | 1.9 |
| Xylene | 23.4 |
| BYK ® 370 | 1.3 |
| Colorant Paste | |
| Shepherd Colorant | 50.0 |
| POLYMAC ® 220-1935 resin | 47.1 |
| DISPERBYK ® 110 | 2.9 |

POLYMAC® 220-1935 is a thermosetting polyester resin. BYK® 370 is a solution of a polyester modified hydroxy functional polydimethylsiloxane, and DISPERBYK® 110 is a dispersing additive. CYMEL® 303 is a methylated melamine-formaldehyde resin. NACURE® is a curing agent. Xylene is an organic solvent.

The following four $TiO_2$ samples were tested and compared: TIONA® 696 and RCL-6™ finished products (from Millennium Inorganic Chemicals) and the TIONA® 696 and RCL-6™ spray dryer discharge samples (obtained from Millennium Inorganic Chemicals). The color pigments used in the study are from the Shepherd Company. They are mixed metal oxides, including Black 411A, Blue 214, and Green 410.

At the polyester coil grind stage, the mixture of the resin, dispersing additive, and $TiO_2$ samples are mixed and then dispersed using a high speed disperser at 3000 rpm for 30 minutes. Four grind samples, each with a $TiO_2$ sample, were prepared and then further prepared with the letdown stage.

The different grind samples were first dispersed using the high speed disperser and then further dispersed using the Eiger Mill at the grind stage. The samples were further prepared with the letdown stage. After the letdown stage, the Shepherd colorant paste was added. The dispersion of the colorant paste in the coating formulation was accomplished by using the high speed disperser operated at 3500 rpm.

The colorant paste was prepared by mixing the polyester resin, dispersing additive, and the colorant and then dispersed using a high speed disperser. The mixture was then further dispersed using the Eiger mill.

Preparation of Silicate Coating for Roofing Granules A mixture of the following composition was prepared: 20.0 g Water; 150.0 g Sodium Silicate Grade 40; and 50.0 g Hydragloss® clay. The sodium silicate Grade 40 was obtained from Occidental Chemical Corporation and Hydragloss® clay from J. M. Huber Corporation.

To prepare the coating sample, 44.0 grams well dispersed mixture from above was put into a 4-oz plastic bottle. For each sample, 7.5 grams dry $TiO_2$ of comparative grades were added. The following two $TiO_2$ samples were tested and compared: TIONA® 696 finished product and the TIONA® 696 spray dryer discharge sample.

The color pigments used in the silicate coating were Black 411A obtained from the Shepherd Company. In the sample bottle containing TIONA® 696 spray dryer discharge, 8.0 grams Black 411A was added. In the sample bottles containing TIONA® 696 finished product, Black 411A ranging from 8.0 grams to 11.0 grams were added.

Reflectance Measurements. UV-VIS-NIR spectrometers from StellarNet Inc. were used to perform the reflectance measurement of the coating panels. The system consists of two portable spectrometers, the UV-VIS spectrometer (Model BLK-CXR-SR) for 220-1100 nm range, and the NIR spectrometer (Model RW-InGaAs-512) for 900-1700 nm range. The spectrometers share one 5 Watt fiber-optic light source, Tungsten Krypton, for 300-1700 nm range.

A 50 mm diameter white reflectance standard (Model RS50) is used for reflectance intensity calibration. In the spectral reflectance measurement, the reflectance values between 400 nm and 1700 nm are measured. The reflectance values for wavelengths lower than 400 nm are low and not measured due to strong absorption of light by $TiO_2$ in the UV wavelength range.

Solar Reflectance Index Calculations. A solar reflectance index (SRI) was calculated from the results of the reflectance measurement of the coating panels using the method described in ASTM E1980-01. To calculate SRI, the solar radiation reference spectra data based on ASTM G173-03 are used. To perform the calculation, a thermal emissivity value of 0.90 and a convective coefficient of 12 were assumed.

In the reflectance measurement, only the reflectance values in the range between 400 nm and 1700 nm are measured. This wavelength range does not cover the whole range of the solar spectrum. The solar radiation intensity in this wavelength range consists of 90.9% of the total. The solar intensity in 280-400 nm range and 1700-2500 nm range are 3.9% and 5.2%, respectively. Even though the SRI values are calculated based on the wavelengths between 400 nm and 1700 nm, we believe the values are meaningful for comparison between samples.

Comparative Example 1

The optical density particle size distributions of finished TIONA® 696 (sometimes referred to as T-696) and RCL-6™ $TiO_2$ product pigment samples were measured using the optical density method. TIONA® 696 product pigment had a mean particle size of 0.299 p with a GSD of 1.437. RCL-6™ product pigment had a mean particle size of 0.319 p with a GSD of 1.492. Samples of the spray dryer discharge (SDD) for each product were also obtained from normal plant production. 320 grams of each spray dryer discharge sample were placed in a 2-liter plastic beaker and 400 grams of tap water were added. A high speed disperser (DISPERMAT® Model FE) with a 2" Cowles blade at 3000 rpm was used for the dispersion experiments. The mean size and GSD of the spray dryer discharge samples were measured for different dispersing times. While the product pigment particle size measurements reflect primary particles with minimal agglomeration; the spray dryer discharge particle sizes, shown in Table 2 below, reflect the size of the titanium dioxide clusters. As can be seen, the $TiO_2$ clusters are quite robust and resistant to breakdown in the high speed disperser.

TABLE 2

Cluster Size Measurements with Dispersion

| Sample ID and Disp. Time | Mean Size, µ | GSD |
|---|---|---|
| TIONA ®-696 SDD @ 0 min | 0.598 | 1.61 |
| TIONA ®-696 SDD @ 15 min | 0.564 | 1.62 |
| TIONA ®-696 SDD @ 30 min | 0.554 | 1.61 |
| TIONA ®-696 SDD @ 60 min | 0.538 | 1.60 |
| RCL-6 ™ SDD @ 0 min | 0.622 | 1.64 |
| RCL-6 ™ SDD @ 15 min | 0.598 | 1.62 |
| RCL-6 ™ SDD @ 30 min | 0.592 | 1.62 |
| RCL-6 ™ SDD @ 60 min | 0.592 | 1.60 |

Particle size distribution of TIONA®-696 and RCL-6™ spray dryer discharge samples were also measured after dispersion with media (bead) milling. Again, the spray dryer discharge (SDD) samples were obtained from normal plant production. 160 grams of the spray dryer discharge sample was placed in a 0.5-liter plastic bottle and 240 grams of tap water was added. The bottle was rolled in a roller overnight. An Eiger Laboratory Mini Mill, Model M100 was used for the dispersion experiment. The volume of the milling chamber is 100 ml. The chamber was filled with 70 ml of the milling media. Ceramic media with a density of 4.3 and diameter at 2 mm was used. The resulting particle size measurements are shown in Table 3 below. Although the media mill did reduce the average cluster size somewhat, the $TiO_2$ clusters still appear quite robust with a GSD virtually unchanged.

TABLE 3

Cluster Size Measurements after Milling

| Sample ID and Milling Time | Mean Size, µ | GSD |
|---|---|---|
| TIONA ®-696 SDD @ 0 min | 0.578 | 1.60 |
| TIONA ®-696 SDD @ 15 min | 0.480 | 1.64 |
| TIONA ®-696 SDD @ 30 min | 0.446 | 1.62 |
| TIONA ®-696 SDD @ 60 min | 0.428 | 1.61 |
| RCL-6 ™ SDD @ 0 min | 0.614 | 1.63 |
| RCL-6 ™ SDD @ 15 min | 0.462 | 1.62 |
| RCL-6 ™ SDD @ 30 min | 0.428 | 1.59 |
| RCL-6 ™ SDD @ 60 min | 0.436 | 1.60 |

Comparative Example 2

The following samples were compared for reflectance properties in a coil coating using Shepherd Black 411A Colorant. For Sample 4a, white wet coil coating was prepared with the high speed disperser only at the grinding stage and followed by the letdown stage. Finished TIONA® 696 was used as TiO$_2$ pigment. 100 grams of white coating was placed in an 8 oz metal paint can. 22.52 grams colorant paste made with Shepherd Black 411A was added to the can. The content in the paint can was agitated for 10 minutes using a RED-DEVIL™ paint shaker. A drawdown using #28 wire-wound rod was made onto an aluminum panel and cured. The amount of colorant paste used was to target the L* at 54%. The L* value measured for the cured coating was 54.12%. From the reflectance results, the calculated SRI value is 44.07.

For Sample 4b, the above procedure for Sample 4a was repeated; except TIONA® 696 spray dryer discharge (SDD) was used. To reach the L* target at 54%, 11.62 grams black colorant paste was added. The L* value measured for the cured coating was 54.19%. From the reflectance results, the calculated SRI value is 46.42. Thus, the amount of black colorant could be cut in half.

Figure 2:
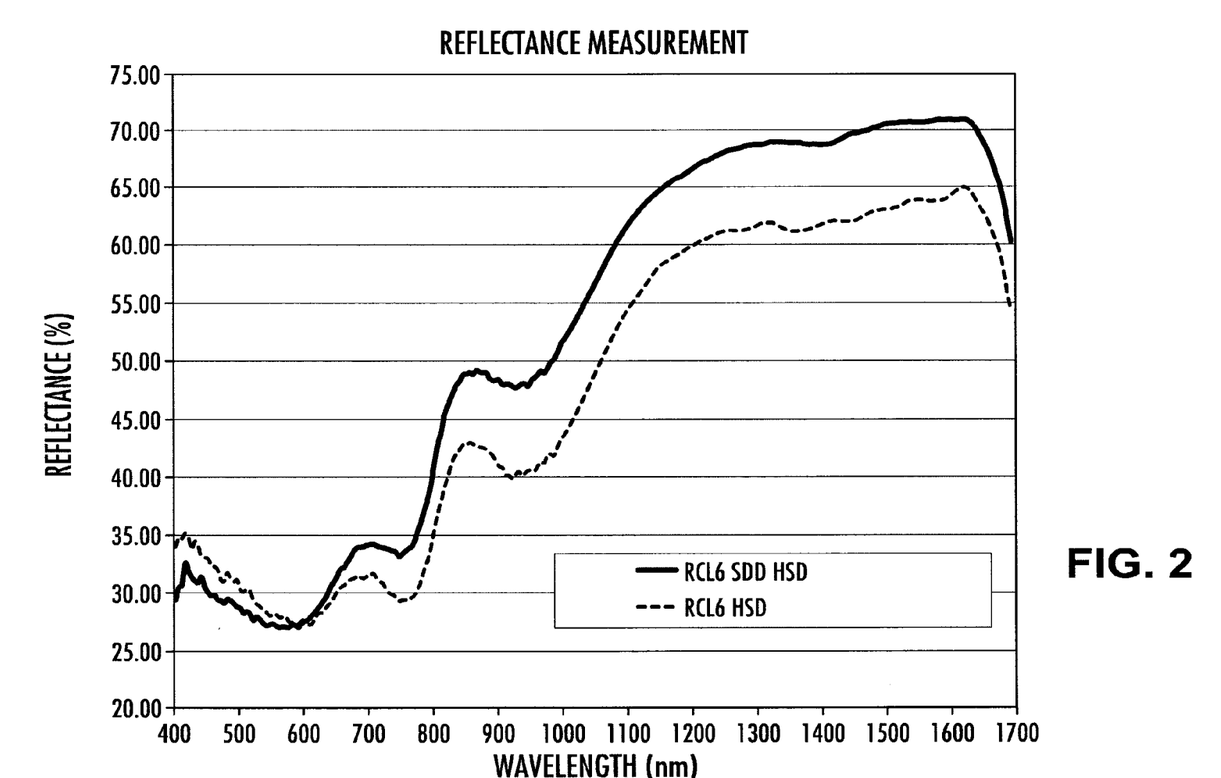
FIG. 2 is a graphical representation of the reflectance measurements comparing RCL-6™ and RCL-6™ SDD, as represented by samples 5a and 5b from Comparative Example 2.

For Sample 5a, white wet coil coating was prepared with the high speed disperser only at the grinding stage and followed by the letdown stage. Finished RCL-6™ was used as TiO$_2$ pigment. 100 grams of white coating was placed in an 8 oz metal paint can. 18.88 grams colorant paste, made with Shepherd Black 411A, was added to the can. The content in the paint can was agitated for 10 minutes using a RED-DEVIL™ paint shaker. A drawdown using #28 wire-wound rod was made onto an aluminum panel and cured. The amount of colorant paste used was to target the L* at 54%. The L* value measured for the cured coating was 53.98%. The measured reflectance values are shown in FIG. 2. From the reflectance results, the calculated SRI value is 43.63.

Sample 5b preparation repeated that for Sample 5a white wet coil coating preparation, except RCL-6™ spray dryer discharge (SDD) was used. To reach the L* target at 54%, 10.04 grams black colorant paste was added. The L* value measured for the cured coating was 53.94%. The measured reflectance values are shown in FIG. 2. From the reflectance results, the calculated SRI value is 47.63.

Figure 3:
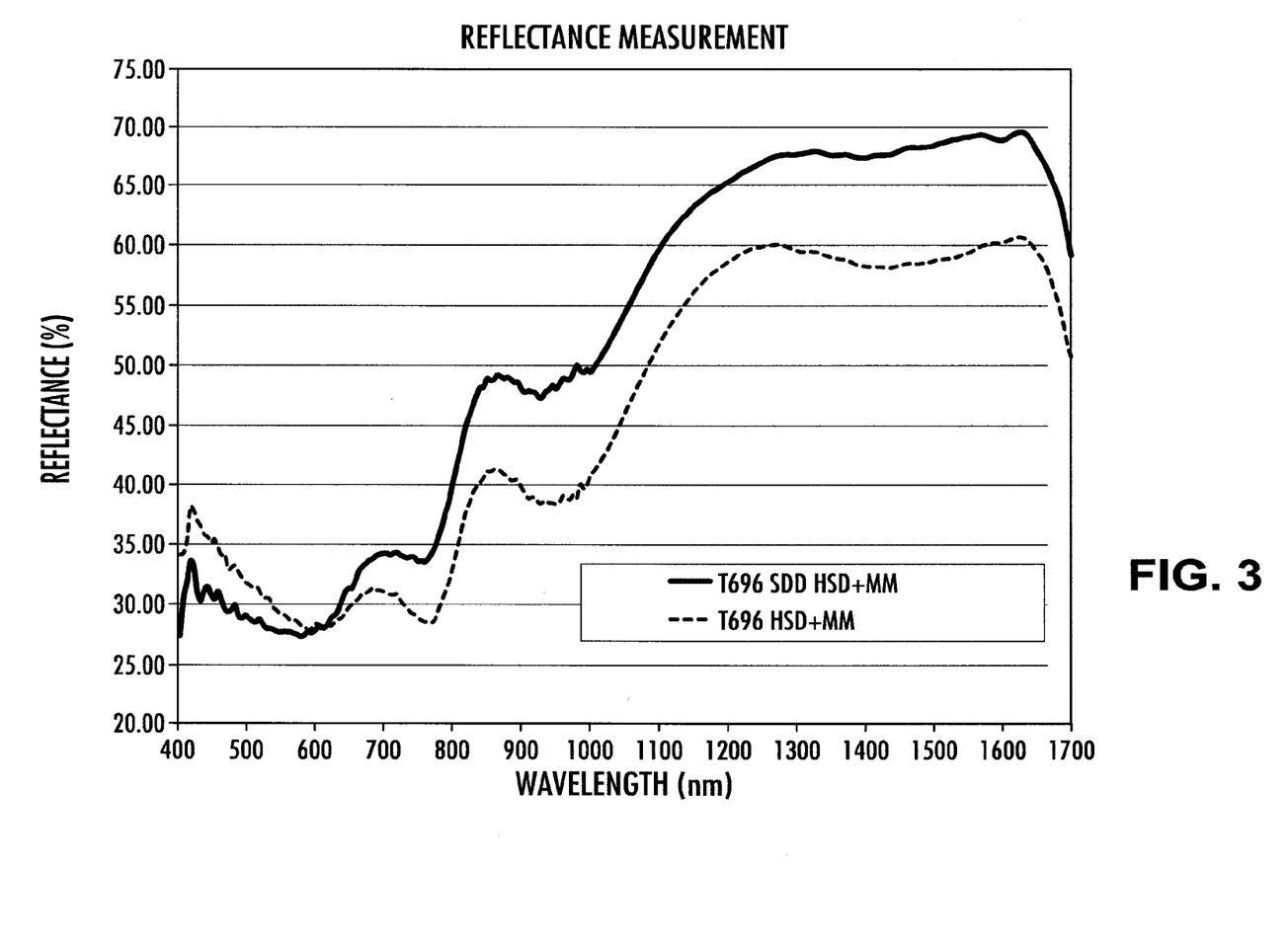
FIG. 3 is a graphical representation of the reflectance measurements comparing TIONA®-696 and TIONA®-696 SDD, as represented by samples 6a and 6b from Comparative Example 2.

For Sample 6a, white wet coil coating was prepared with the high speed disperser and then media milled with the Eiger mill at the grinding stage and followed by the letdown stage. Finished TiONA® 696 was used as TiO$_2$ pigment. 100 grams of white coating was placed in an 8 oz metal paint can. 23.05 grams colorant paste made with Shepherd Black 411A was added to the can. The content in the paint can was agitated for 10 minutes using a RED-DEVIL™ paint shaker. A drawdown using #28 wire-wound rod was made on to an aluminum panel and cured. The amount of colorant paste used was to target the L* at 54%. The L* value measured for the cured coating was 54.16%. The measured reflectance values are shown in FIG. 3. From the reflectance results, the calculated SRI value is 42.88.

Sample 6b preparation repeated that for Sample 6a white wet coil coating preparation, except TiONA®-696 spray dryer discharge (SDD) was used. To reach the L* target at 54%, 13.72 grams black colorant paste was added. The L* value measured for the cured coating was 54.19%. The measured reflectance values are shown in FIG. 3. From the reflectance results, the calculated SRI value is 47.38.

For Sample 7a, white wet coil coating was prepared with the high speed disperser and then media milled with the Eiger mill at the grinding stage followed by the letdown stage. Finished RCL-6™ was used as TiO$_2$ pigment. 100 grams of white coating was placed in an 8 oz metal paint can. 18.96 grams colorant paste made with Shepherd Black 411A was added to the can. The content in the paint can was agitated for 10 minutes using a RED-DEVIL™ paint shaker. A drawdown using #28 wire-wound rod was made on to an aluminum panel and cured. The amount of colorant paste used was to target the L* at 54%. The L* value measured for the cured coating was 54.34%. From the reflectance results, the calculated SRI value is 44.96.

Sample 7b preparation repeated that for Sample 7a white wet coil coating preparation, except RCL-6™ spray dryer discharge (SDD) was used. To reach the L* target at 54%, 13.19 grams black colorant paste was added. The L* value measured for the cured coating was 54.50%. From the reflectance results, the calculated SRI value is 46.30.

The results for Samples 4a through 7b are summarized in Table 4. Comparing the finished product and the spray dryer discharge samples of TIONA®-696 and RCL-6™, the results consistently show that for the spray dryer discharge samples, the coatings use considerably less Shepherd black colorant 411A to obtain the target L* value of 54%. Also, the SRI values are higher for the spray dryer discharge samples. FIG. 2 shows the reflectance measurement results comparing RCL-6™ and RCL-6™ SDD with dispersion using high speed disperser only (Samples 5a and 5b). FIG. 3 shows the reflectance measurement results comparing TIONA®-696 and TIONA®-696 SDD with dispersion using high speed disperser and the Eiger media mill (Samples 6a and 6b). The NIR reflectance values are higher for the SDD samples.

TABLE 4

Summary Results for Comparative Example 2 Using Black 411A Colorant

| Sample | TiO2 | Dispersion | Paint (g) | Tint (g) | L* | SRI |
|---|---|---|---|---|---|---|
| 4a | TIONA ®696 | HSD | 100.00 | 22.52 | 54.12 | 44.07 |
| 4b | TIONA ®696 SDD | HSD | 100.00 | 11.62 | 54.19 | 46.42 |
| 5a | RCL-6 ™ | HSD | 100.00 | 18.88 | 53.98 | 43.63 |
| 5b | RCL-6 ™ SDD | HSD | 100.00 | 10.04 | 53.94 | 47.63 |
| 6a | TIONA ®696 | HSD + MM | 100.00 | 23.05 | 54.16 | 42.88 |
| 6b | TIONA ®696 SDD | HSD + MM | 100.00 | 13.72 | 54.19 | 47.38 |
| 7a | RCL-6 ™ | HSD + MM | 100.00 | 18.96 | 54.34 | 44.96 |
| 7b | RCL-6 ™ SDD | HSD + MM | 100.00 | 13.19 | 54.50 | 46.30 |

Comparative Example 3

The following samples were compared for reflectance properties in a coil coating using Shepherd Blue 214 Colorant. For Sample 8a, white wet coil coating was prepared with the high speed disperser only at the grinding stage and followed by the letdown stage. Finished TiONA® 696 was used as TiO$_2$ pigment. 100 grams of white coating was placed in an 8 oz metal paint can. 32.22 grams colorant paste made with Shepherd Blue 214 was added to the can. The content in the paint can was agitated for 10 minutes using a RED-DEVIL® paint shaker. A drawdown using #28 wire-wound rod was made on to an aluminum panel and cured. The amount of colorant paste used was to target the L* at 64.9%. The L* value measured for the cured coating was 64.99%. From the reflectance results, the calculated SRI value is 69.80.

Sample 8b preparation repeated that for Sample 8a white wet coil coating preparation, except TiONA® 696 spray dryer discharge (SDD) was used. To reach the L* target at 64.9%, 21.75 grams blue colorant paste was added. The L* value measured for the cured coating was 64.92%. From the reflectance results, the calculated SRI value is 73.02.

For Sample 9a, white wet coil coating was prepared with the high speed disperser only at the grinding stage and followed by the letdown stage. Finished RCL-6™ was used as TiO₂ pigment. 100 grams of white coating was placed in an 8 oz metal paint can. 30.23 grams colorant paste made with Shepherd Blue 214 was added to the can. The content in the paint can was agitated for 10 minutes using a RED-DEVIL™ paint shaker. A drawdown using #28 wire-wound rod was made on to an aluminum panel and cured. The amount of colorant paste used was to target the L* at 64.9%. The L* value measured for the cured coating was 64.90%. From the reflectance results, the calculated SRI value is 71.38.

Sample 9b preparation repeated that for Sample 9a white wet coil coating preparation, except RCL-6™ spray dryer discharge (SDD) was used. To reach the L* target at 64.9%, 20.65 grams blue colorant paste was added. The L* value measured for the cured coating was 64.95%. From the reflectance results, the calculated SRI value is 73.36.

Figure 4:
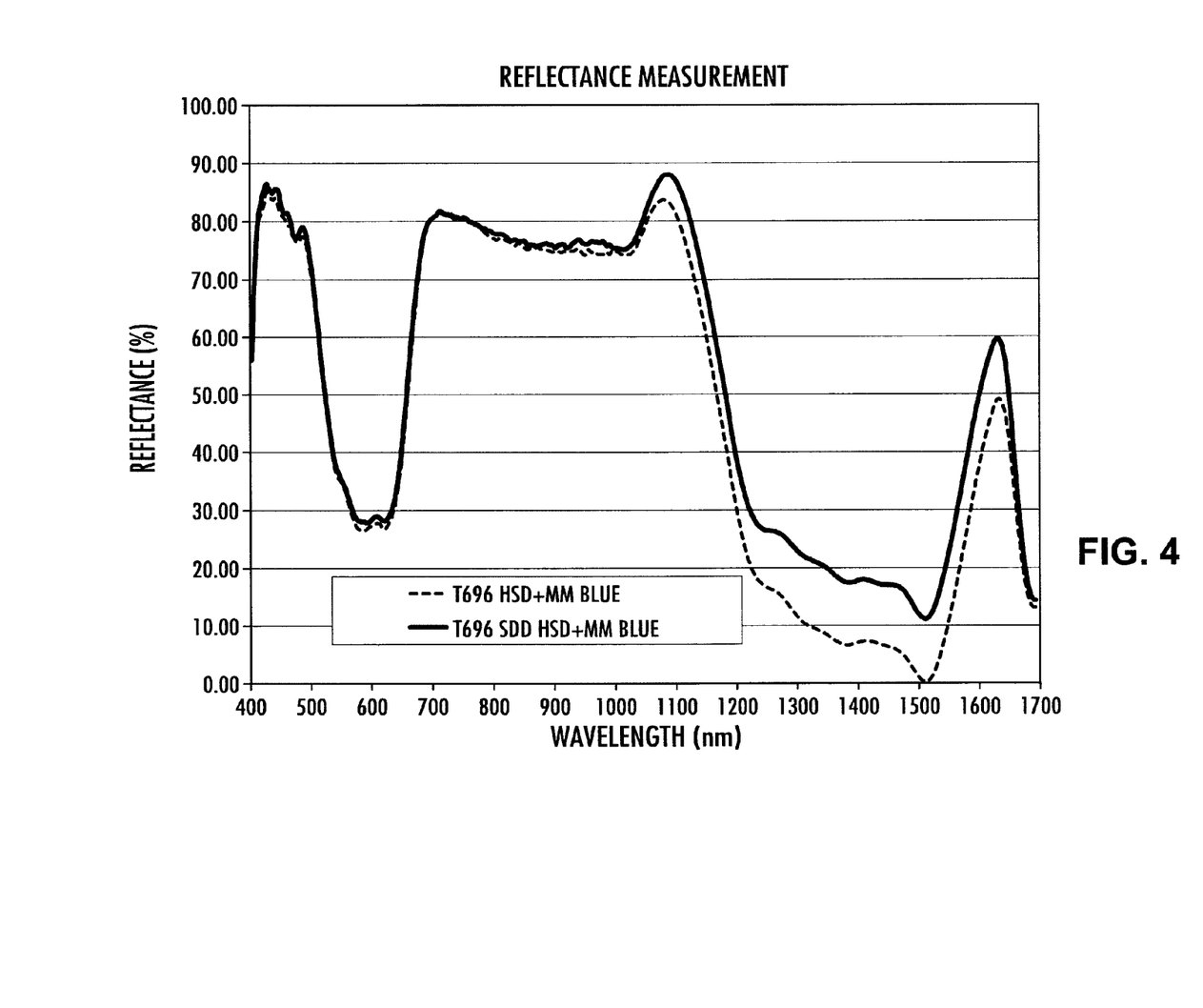
FIG. 4 is a graphical representation of the reflectance measurements comparing TIONA®-696 and TIONA®-696 SDD, as represented by samples 10a and 10b from Comparative Example 3.

For Sample 10a, white wet coil coating was prepared with the high speed disperser and then media milled with the Eiger mill at the grinding stage and followed by the letdown stage. Finished TiONA 696 was used as TiO2 pigment. 100 grams of white coating was placed in an 8 oz metal paint can. 32.93 grams colorant paste made with Shepherd Blue 214 was added to the can. The content in the paint can was agitated for 10 minutes using a RED-DEVIL™ paint shaker. A drawdown using #28 wire-wound rod was made on to an aluminum panel and cured. The amount of colorant paste used was to target the L* at 64.9%. The L* value measured for the cured coating was 64.77%. The measured reflectance values are shown in FIG. 4. From the reflectance results, the calculated SRI value is 69.48.

Sample 10b preparation repeated that for Sample 10a white wet coil coating preparation, except TIONA® 696 spray dryer discharge (SDD) was used. To reach the L* target at 64.9%, 26.11 grams blue colorant paste was added. The L* value measured for the cured coating was 64.91%. The measured reflectance values are shown in FIG. 4. From the reflectance results, the calculated SRI value is 72.85.

For Sample 11a, white wet coil coating was prepared with the high speed disperser and then media milled with the Eiger mill at the grinding stage and followed by the letdown stage. Finished RCL-6™ was used as TiO2 pigment. 100 grams of white coating was placed in an 8 oz metal paint can. 30.25 grams colorant paste made with Shepherd Blue 214 was added to the can. The content in the paint can was agitated for 10 minutes using a RED-DEVIL™ paint shaker. A drawdown using #28 wire-wound rod was made on to an aluminum panel and cured. The amount of colorant paste used was to target the L* at 64.9%. The L* value measured for the cured coating was 64.92%. From the reflectance results, the calculated SRI value is 71.63.

Sample 11b preparation repeated that for Sample 11a white wet coil coating preparation, except RCL-6 spray dryer discharge (SDD) was used. To reach the L* target at 64.9%, 26.08 grams blue colorant paste was added. The L* value measured for the cured coating was 64.96%. From the reflectance results, the calculated SRI value is 71.84.

The results for Samples 8a through 11b are summarized in Table 5. Comparing the finished product and the spray dryer discharge samples of TIONA®696 and RCL6™, the results consistently show that for the spray dryer discharge samples, the coatings use considerably less Shepherd blue colorant 214 to obtain the target L* value of 64.9%. Also, the SRI values are higher for the spray dryer discharge samples.

FIG. 4 shows the reflectance measurement results comparing TIONA®-696 and TIONA®-696 SDD with dispersion using high speed disperser and the Eiger media mill (Samples 10a and 10b). The NIR reflectance values are higher for the SDD sample.

TABLE 5

Summary Results for Comparative Example 3 Using Blue 214 Colorant

| Sample | TiO2 | Dispersion | Paint (g) | Tint (g) | L* | SRI |
|---|---|---|---|---|---|---|
| 8a | TIONA ®696 | HSD | 100.00 | 32.22 | 64.99 | 69.80 |
| 8b | TIONA ®696 SDD | HSD | 100.00 | 21.75 | 64.92 | 73.02 |
| 9a | RCL6 ™ | HSD | 100.00 | 30.23 | 64.90 | 71.38 |
| 9b | RCL6 ™ SDD | HSD | 100.00 | 20.65 | 64.95 | 73.36 |
| 10a | TIONA ®696 | HSD + MM | 100.00 | 32.93 | 64.77 | 69.48 |
| 10b | TIONA ®696 SDD | HSD + MM | 100.00 | 26.11 | 64.91 | 72.85 |
| 11a | RCL6 ™ | HSD + MM | 100.00 | 30.25 | 64.92 | 71.63 |
| 11b | RCL6 ™ SDD | HSD + MM | 100.00 | 26.08 | 64.96 | 71.84 |

Comparative Example 4

The following samples were compared for reflectance properties in a coil coating using Shepherd Green 410 Colorant. For Sample 12a, white wet coil coating was prepared with the high speed disperser only at the grinding stage and followed by the letdown stage. Finished TiONA® 696 was used as TiO2 pigment. 100 grams of white coating was placed in an 8 oz metal paint can. 32.48 grams colorant paste made with Shepherd Green 410 was added to the can. The content in the paint can was agitated for 10 minutes using a RED-DEVIL™ paint shaker. A drawdown using #28 wire-wound rod was made on to an aluminum panel and cured. The amount of colorant paste used was to target the L* at 69.9%. The L* value measured for the cured coating was 69.97%. From the reflectance results, the calculated SRI value is 67.00.

Preparation of Sample 12b repeated that for sample 12a in the white wet coil coating preparation, except TiONA® 696 spray dryer discharge (SDD) was used. To reach the L* target at 69.9%, 20.24 grams green colorant paste was added. The L* value measured for the cured coating was 69.90%. From the reflectance results, the calculated SRI value is 69.79.

For preparation of Sample 13a, white wet coil coating was prepared with the high speed disperser only at the grinding stage and followed by the letdown stage. Finished RCL-6™ was used as TiO2 pigment. 100 grams of white coating was placed in an 8 oz metal paint can. 31.18 grams colorant paste made with Shepherd Green 410 was added to the can. The content in the paint can was agitated for 10 minutes using a RED-DEVIL™ paint shaker. A drawdown using #28 wire-wound rod was made on to an aluminum panel and cured. The amount of colorant paste used was to target the L* at 69.9%. The L* value measured for the cured coating was 69.91%. From the reflectance results, the calculated SRI value is 67.13.

Preparation of Sample 13b repeated that for Sample 13a white wet coil coating preparation, except RCL-6 spray dryer discharge (SDD) was used. To reach the L* target at 69.9%, 19.40 grams green colorant paste was added. The L* value measured for the cured coating was 69.91%. From the reflectance results, the calculated SRI value is 70.37.

Figure 5:
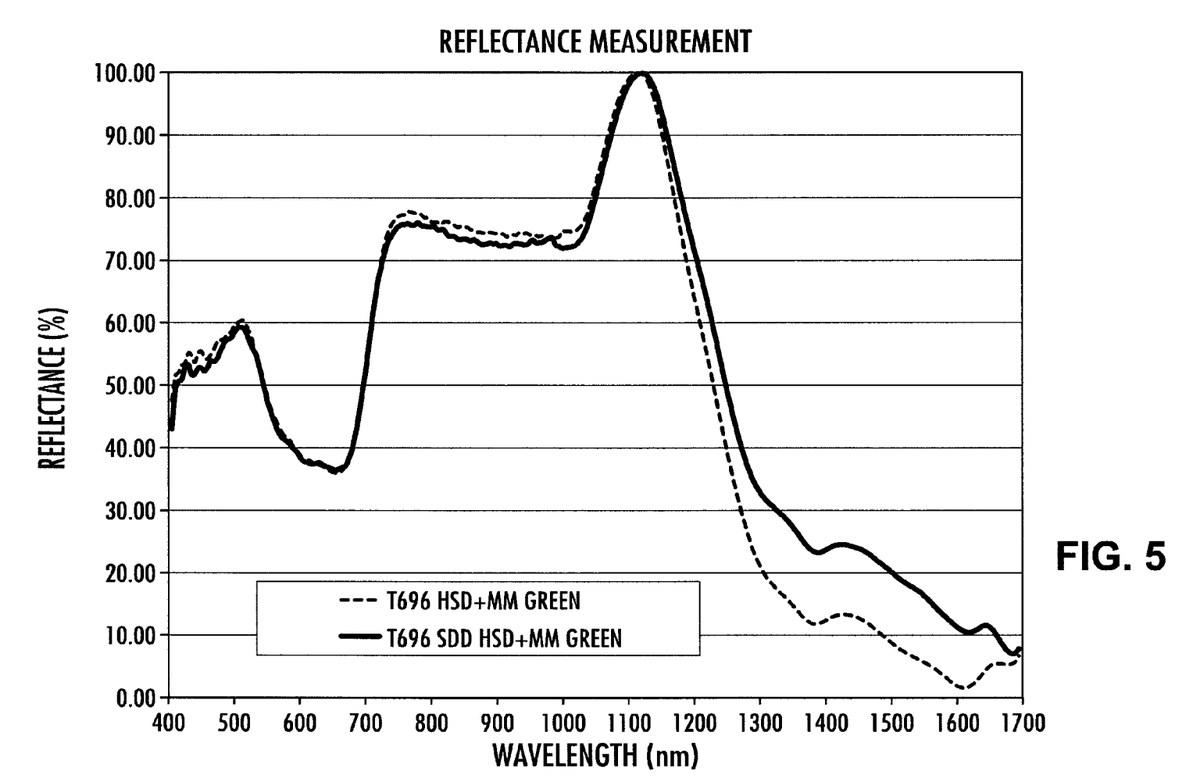
FIG. 5 is a graphical representation of the reflectance measurements comparing TIONA®-696 and TIONA®-696 SDD, as represented by samples 14a and 14b from Comparative Example 4.

For preparation of Sample 14a, white wet coil coating was prepared with the high speed disperser and then media milled with the Eiger mill at the grinding stage and followed by the letdown stage. Finished TiONA 696 was used as TiO2 pigment. 100 grams of white coating was placed in an 8 oz metal paint can. 33.20 grams colorant paste made with Shepherd Green 410 was added to the can. The content in the paint can was agitated for 10 minutes using a Red-Devil paint shaker. A drawdown using #28 wire-wound rod was made on to an aluminum panel and cured. The amount of colorant paste used was to target the L* at 69.9%. The L* value measured for the cured coating was 69.84%. The measured reflectance values are shown in FIG. 5. From the reflectance results, the calculated SRI value is 66.40.

Preparation of Sample 14b repeated that for Sample 14a white wet coil coating preparation, except TiONA® 696 spray dryer discharge (SDD) was used. To reach the L* target at 69.9%, 24.94 grams green colorant paste was added. The L* value measured for the cured coating was 70.02%. The measured reflectance values are shown in FIG. 5. From the reflectance results, the calculated SRI value is 67.07.

For Sample 15a, white wet coil coating was prepared with the high speed disperser and then media milled with the Eiger mill at the grinding stage and followed by the letdown stage. Finished RCL-6™ was used as TiO2 pigment. 100 grams of white coating was placed in an 8 oz metal paint can. 31.44 grams colorant paste made with Shepherd Green 410 was added to the can. The content in the paint can was agitated for 10 minutes using a RED-DEVIL™ paint shaker. A drawdown using #28 wire-wound rod was made on to an aluminum panel and cured. The amount of colorant paste used was to target the L* at 69.9%. The L* value measured for the cured coating was 69.90%. From the reflectance results, the calculated SRI value is 64.54.

Sample 15b preparation repeated that for Sample 15a white wet coil coating preparation, except RCL-6™ spray dryer discharge (SDD) was used. To reach the L* target at 69.9%, 24.95 grams green colorant paste was added. The L* value measured for the cured coating was 69.96%. From the reflectance results, the calculated SRI value is 69.45.

The results for Samples 12a through 15b are summarized in Table 6. The results consistently show that the coatings using spray dryer discharge rather than finished pigment required considerably less Shepherd Green colorant 410 to obtain the target L* value of 69.9%. Also, the SRI values are higher for the spray dryer discharge samples. FIG. 5 shows the reflectance measurement results comparing TIONA®-696 and TIONA®-696 SDD with dispersion using high speed disperser and the Eiger media mill (Samples 14a and 14b). The NIR reflectance values are higher for the SDD sample.

TABLE 6

Summary Results for Comparative Example 4 Using Green 410 Colorant

| Sample | TiO2 | Dispersion | Paint (g) | Tint (g) | L* | SRI |
|---|---|---|---|---|---|---|
| 12a | TIONA ®696 | HSD | 100.00 | 32.48 | 69.97 | 67.00 |
| 12b | TIONA ®696 SDD | HSD | 100.00 | 20.24 | 69.90 | 69.79 |
| 13a | RCL6 ™ | HSD | 100.00 | 31.18 | 69.91 | 67.13 |
| 13b | RCL6 ™ SDD | HSD | 100.00 | 19.40 | 69.91 | 70.37 |
| 14a | TIONA ®696 | HSD + MM | 100.00 | 33.20 | 69.84 | 66.40 |
| 14b | TIONA ®696 SDD | HSD + MM | 100.00 | 24.94 | 70.02 | 67.07 |
| 15a | RCL6 ™ | HSD + MM | 100.00 | 31.44 | 69.90 | 64.54 |
| 15b | RCL6 ™ SDD | HSD + MM | 100.00 | 24.95 | 69.96 | 69.45 |

Comparative Example 5

The following samples were compared for reflectance properties in a silicate coating. Sample 16a was prepared using 44.0 grams aqueous sodium silicate and Hydragloss® clay mixture put into a 4-oz plastic bottle. 7.5 grams TiONA® 696 spray dryer discharge (SDD) sample and 8.0 grams Shepherd Black 411A colorant were added to the bottle. The content of the sample bottle was mixed over-night using a roller operated at a moderate speed. A drawdown using a 6-mil Bird drawdown bar was made on to steel panel and cured. The L* value measured for the cured coating was 41.81%. From the reflectance results, the calculated SRI value is 26.02. Sample 16b preparation repeated that for Sample 16a in the silicate coating preparation, except TiONA® 696 finished product was used. To reach the L* target at about 41.8%, 9.5 grams Shepherd Black 411A colorant was added. The L* value measured for the cured coating was 41.72%. From the reflectance results, the calculated SRI value is 25.26.

Comparison of Sample 16a and 16b shows that for the spray dryer discharge, the silicate coatings use 16% less Shepherd black 411A colorant to obtain the target L* value of 41.8%. Also, the SRI values are higher for the spray dryer discharge sample.

From the above examples and descriptions, it is clear that the present inventive process(es), methodology(ies), apparatus(es) and composition(s) are well adapted to carry out the objects and to attain the advantages mentioned herein, as well as those inherent in the presently provided disclosure. While presently preferred embodiments of the invention have been described for purposes of this disclosure, it will be understood that numerous changes may be made which will readily suggest themselves to those skilled in the art and which are accomplished within the spirit of the presently claimed and disclosed inventive process(es), methodology(ies), apparatus (es) and composition(s) described herein.

What is claimed is:

1. A composition comprising a polymer with infrared-reflective clusters dispersed therein, wherein the infrared-reflective clusters comprise titanium dioxide primary particles and a precipitate, wherein the titanium dioxide primary particles are cemented together with the precipitate to form the infrared-reflective clusters, wherein the titanium dioxide primary particles have an average particle diameter in a range of from about 0.15 to about 0.35 micron microns, and the infrared-reflective clusters of titanium dioxide primary particles have a geometric mass mean cluster diameter in a range of from about 0.38 to about 5 microns and a geometric standard deviation (GSD) in a range of from about 1.55 to about 2.5.

2. The composition of claim 1, wherein the clusters of titanium dioxide primary particles have a geometric mass mean cluster diameter in a range of from about 0.38 to about 1 micron.

3. The composition of claim 1, wherein the clusters of titanium dioxide primary particles have a geometric standard deviation (GSD) in a range of from about 1.55 to about 2.00.

4. The composition of claim 1, wherein the precipitate cementing the titanium dioxide primary particles comprises precipitated silica.

5. The composition of claim 4, wherein the precipitated silica is present in the infrared-reflective clusters at an amount in a range of from about 2wt. % to about 20wt. % based on the weight of titanium dioxide in the clusters.

6. The composition of claim 1, wherein the precipitate cementing the titanium dioxide primary particles comprises precipitated alumina.

7. The composition of claim 6, wherein the precipitated alumina is present in the infrared-reflective clusters at an amount in a range of from about 2wt. % to about 10wt. % based on the weight of titanium dioxide in the clusters.

8. The composition of claim 1, wherein the precipitate cementing the titanium dioxide primary particles consists essentially of silica, alumina or a combination of silica and alumina.

9. The composition of claim 1, wherein the clustered titanium dioxide primary particles have a rutile crystal structure.

10. The composition of claim 1, wherein the clustered titanium dioxide primary particles have an anatase crystal structure.

11. The composition of claim 1, wherein the polymer is a water resistant emulsion polymer.

12. The composition of claim 1, wherein the polymer is a water resistant solvent based polymer.

13. The composition of claim 1, wherein the polymer is selected from the group consisting of polyethylene, alkyds, acrylics, vinyl-acrylics, styrene acrylics, styrene acrylics, vinyl acetate/ethylene (VAE), polyvinyl acetates (PVA), polyurethanes, polyesters, polyamides, phenolics, melamine resins, epoxy, silicones, oils, and combinations thereof.

14. The composition of claim 1, wherein the polymer is selected from the group consisting of polyethylene, polyvinyl chloride, thermoplastic olefin, acrylonitrile butadiene styrene, acrylonitrile-styrene-acrylic, and combinations thereof.

15. The composition of claim 1, further comprising unagglomerated titanium dioxide pigment particles having an average particle diameter in the range of from about 0.15 to about 0.35 micron.

16. The composition of claim 1, further comprising at least one colorant.

* * * * *

UNITED STATES PATENT AND TRADEMARK OFFICE
CERTIFICATE OF CORRECTION

PATENT NO. : 8,828,519 B2
APPLICATION NO. : 13/253351
DATED : September 9, 2014
INVENTOR(S) : Wen et al.

Page 1 of 1

It is certified that error appears in the above-identified patent and that said Letters Patent is hereby corrected as shown below:

In the Specification:

Column 4, line 5: Delete "(e.g. 0.24 p" and replace with -- (e.g. 0.24 µ --.

Column 4, line 21: Delete "0.40p," and replace with -- 0.40 µ, --.

Column 10, line 2: Delete "0.299 p" and replace with -- 0.299 µ --.

Column 10, line 3: Delete "0.319 p" and replace with -- 0.319 µ --.

In the Claims:

Column 16, line 37, Claim 1: After "0.35" delete "micron".

Signed and Sealed this
Twenty-fifth Day of November, 2014

Michelle K. Lee
*Deputy Director of the United States Patent and Trademark Office*